US007113976B2

(12) United States Patent
Watanabe

(10) Patent No.: US 7,113,976 B2
(45) Date of Patent: Sep. 26, 2006

(54) COMMUNICATION APPARATUS AND CONTROL METHOD OF THE SAME

(75) Inventor: Naoya Watanabe, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/056,031

(22) Filed: Jan. 28, 2002

(65) Prior Publication Data

US 2002/0103872 A1 Aug. 1, 2002

(30) Foreign Application Priority Data

Jan. 30, 2001 (JP) ............................ 2001-021792

(51) Int. Cl.
*G06F 15/16* (2006.01)

(52) U.S. Cl. ...................................................... 709/206

(58) Field of Classification Search ......... 709/204–206
See application file for complete search history.

(56) References Cited

U.S. PATENT DOCUMENTS 5,864,684 A * 1/1999 Nielsen ...................... 709/206
5,917,489 A * 6/1999 Thurlow et al. ............ 709/206
5,937,162 A * 8/1999 Funk et al. ................. 709/206
6,282,564 B1 * 8/2001 Smith et al. ................ 709/206
6,353,852 B1 * 3/2002 Nestoriak et al. ........... 709/206
6,549,950 B1 * 4/2003 Lytle et al. ................. 709/206
6,701,348 B1 * 3/2004 Sommerer .................. 709/206
6,912,519 B1 * 6/2005 Shouji ........................ 709/206
2002/0112007 A1 * 8/2002 Wood et al. ................ 709/206
2002/0169834 A1 * 11/2002 Miloslavsky et al. ....... 709/206

FOREIGN PATENT DOCUMENTS

JP 10-155038 6/1998
JP 2000-134311 5/2000

* cited by examiner

*Primary Examiner*—David Wiley
*Assistant Examiner*—Phuoc H. Nguyen
(74) *Attorney, Agent, or Firm*—Fitzpatrick, Cella, Harper & Scinto

(57) ABSTRACT

Disclosed are a communication apparatus capable of registering telephone directory data at once from e-mail containing the telephone directory data into a telephone directory of a communication apparatus. A communication apparatus according to this invention is a communication apparatus having a function of transmitting/receiving e-mail, and characterized by including a communication partner information storage unit for storing communication partner information having predetermined registration items, an identifier detecting unit for detecting a predetermined identifier from received e-mail, and a registering unit for registering information described in the e-mail in accordance with the detected identifier into that registration item of the communication partner information which corresponds to the identifier.

11 Claims, 9 Drawing Sheets

COMMUNICATION APPARATUS AND CONTROL METHOD OF THE SAME

FIELD OF THE INVENTION

The present invention relates to a communication apparatus having an e-mail transmitting/receiving function and a control method of the same and, more particularly, to a communication apparatus capable of registering telephone directory data by using e-mail and a control method of the same.

BACKGROUND OF THE INVENTION

Conventional communication apparatuses such as telephones and facsimile apparatuses can transmit and receive speech data and facsimile image data via public networks. Many such communication apparatuses include a convenient telephone directory which stores the names of a plurality of communication partners together with telephone number data into a memory, in order to facilitate placing a call at the start of transmission.

In addition, some recent communication apparatuses have a function of transmitting and receiving e-mail (e.g., text data, image data, and sound data). These apparatuses can exchange data with a PC and an information terminal such as a portable telephone having an e-mail function via the Internet. Telephone directories of such communication apparatuses can store the e-mail addresses and home page URLs of communication partners, in addition to the names and telephone numbers of these communication partners.

As the functions of these conventional communication apparatuses are complicated, however, the items of data stored in telephone directories are extended to the names, telephone numbers, e-mail addresses, home page URLs, and the like of communication partners, and the information amount is also increasing.

Before using the telephone directory function of a communication apparatus, the user must register telephone directory data. The larger the data amount to be registered in the telephone directory, the more complicated the registering operation. Especially when a user has purchased a new communication apparatus or has erased all telephone directory data, he or she must reregister all data, and this imposes a large load on the user.

As a means for solving this problem, Japanese Patent Laid-Open No. 2000-134311 disclosed the following technique. That is, a telephone directory data file having a specific format is formed by a personal computer, and e-mail having this data file attached is transmitted to a communication terminal. A portable telephone as the communication terminal on the receiving side determines, from the contents of the header of the e-mail such as Subject of the e-mail, that the file attached to the e-mail is telephone directory data, and uses this telephone directory data as a telephone directory. In this prior art, however, to allow a portable telephone on the receiving side to directly use the attached file as a telephone directory, telephone directory data to be registered must be formed in a specific format matching the structure of the telephone directory data of the portable telephone. This results in low versatility.

Also, Japanese Patent Laid-Open No. 10-155038 disclosed an information communication terminal such as a PDA (Personal Digital Assistant) by which a telephone number in e-mail is extracted and registered in a telephone directory. However, this method extracts a telephone number by searching e-mail for numerals and character information such as "*" and "#" used in telephone numbers. Therefore, the method is unsuited to extracting diverse data used in items other than telephone numbers, or registering telephone directory data of all communication partners at the same time.

SUMMARY OF THE INVENTION

It is, therefore, an object of the present invention to provide a communication terminal capable of registering telephone directory data by using e-mail, by which telephone directory data containing various data can be registered at once by using e-mail, and a control method of the same.

That is, one gist of the present invention is a communication apparatus having a function of transmitting/receiving e-mail, characterized by comprising communication partner information storage means for storing communication partner information having predetermined registration items, identifier detecting means for detecting a predetermined identifier from received e-mail, and registering means for registering information described in the e-mail in accordance with the detected identifier into that registration item of the communication partner information which corresponds to the identifier.

Another gist of the present invention is a control method of a communication apparatus which comprises communication partner information storage means for storing communication partner information having predetermined registration items, and which has a function of transmitting/receiving e-mail, characterized by comprising the identifier detection step of detecting a predetermined identifier from received e-mail, and the registration step of registering information described in the e-mail in accordance with the detected identifier into that registration item of the communication partner information which corresponds to the identifier.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the following embodiment, a facsimile apparatus will be explained as an example of a communication apparatus according to the present invention. However, the present invention is of course applicable to any communication apparatus such as a telephone provided that the apparatus has an e-mail transmitting/receiving function and a telephone directory function.

Block Configuration of Facsimile Apparatus

Figure 1:
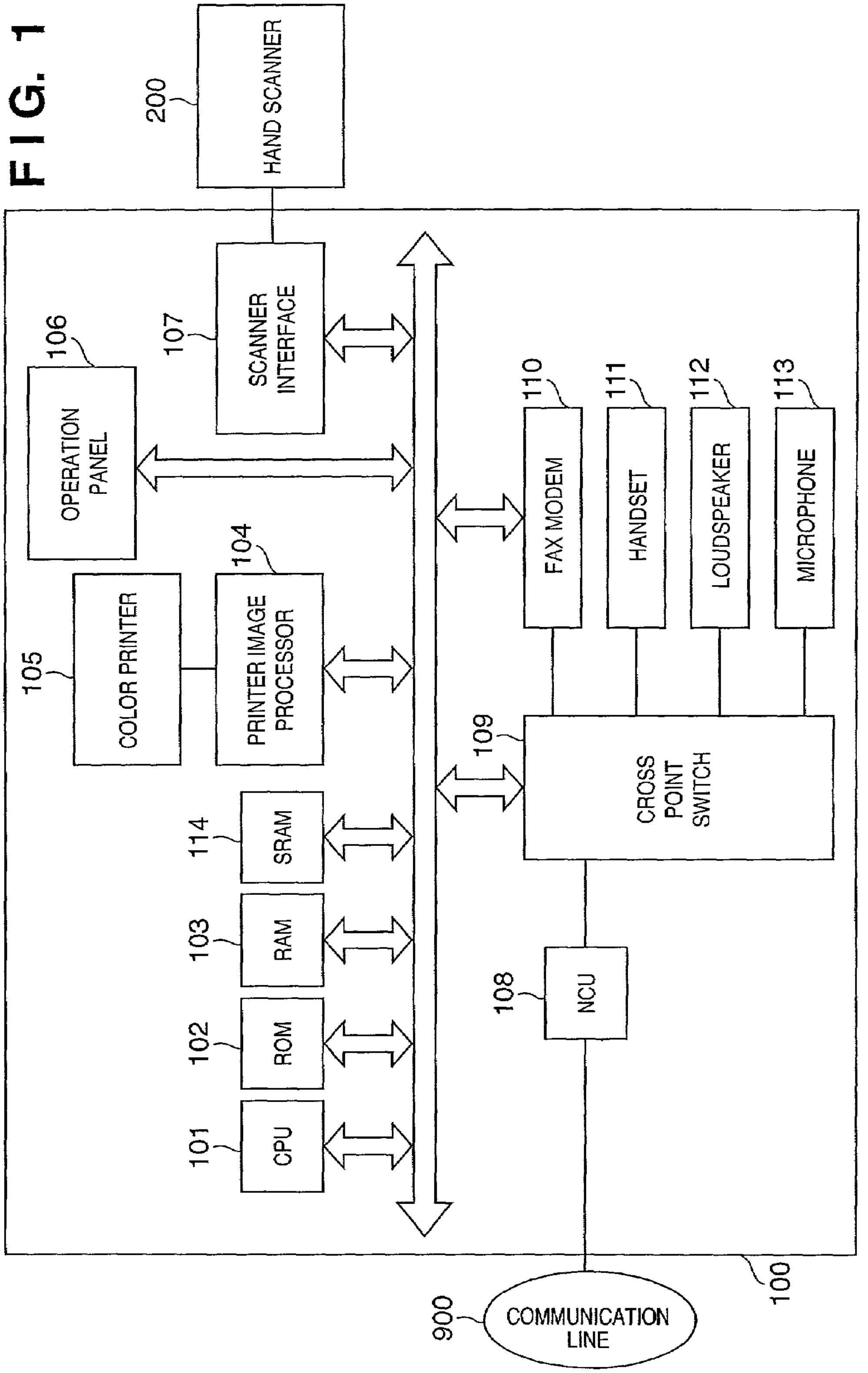
FIG. 1 is a block diagram showing the arrangement of a facsimile apparatus 100 which can be used as a communication apparatus according to the present invention.

FIG. 1 is a block diagram showing the arrangement of a facsimile apparatus 100 applicable as a communication apparatus according to the present invention. Referring to FIG. 1, reference numeral 100 denotes a facsimile apparatus body; 101, a central processing unit (CPU); 102, a ROM storing programs for controlling communication and printing; 103, a RAM; and 114, a nonvolatile memory (SRAM) capable of holding its contents when the apparatus is powered down. For example, data of transmitted/received e-mail is held in this SRAM 114 so as not be erased when the apparatus is powered down.

Reference numeral 104 denotes a printer image processor; and 105, a color printer. The printer image processor 104 converts printing data into data of the resolution (e.g., 360 dpi) of the printer, and transmits the converted printing data to the color printer 105. The color printer 105 has a function of outputting received facsimile images and e-mail. An operation panel 106 comprises a key input unit for performing dialing, forming mail documents, and setting various conditions, and a liquid crystal display for displaying various data.

A scanner interface 107 has a connector for attaching a hand scanner 200 and a data transmitting/receiving register. A cross point switch 109 switches the connections of analog signal paths under the control of the CPU 101. A facsimile modem 110 has a function of receiving facsimile signals and modulating images read by the hand scanner 200 into analog signals. Reference numeral 111 denotes a handset; 112, a loudspeaker; and 108, an NCU as a communication line interface.

Block Configuration of Hand Scanner

Figure 2:
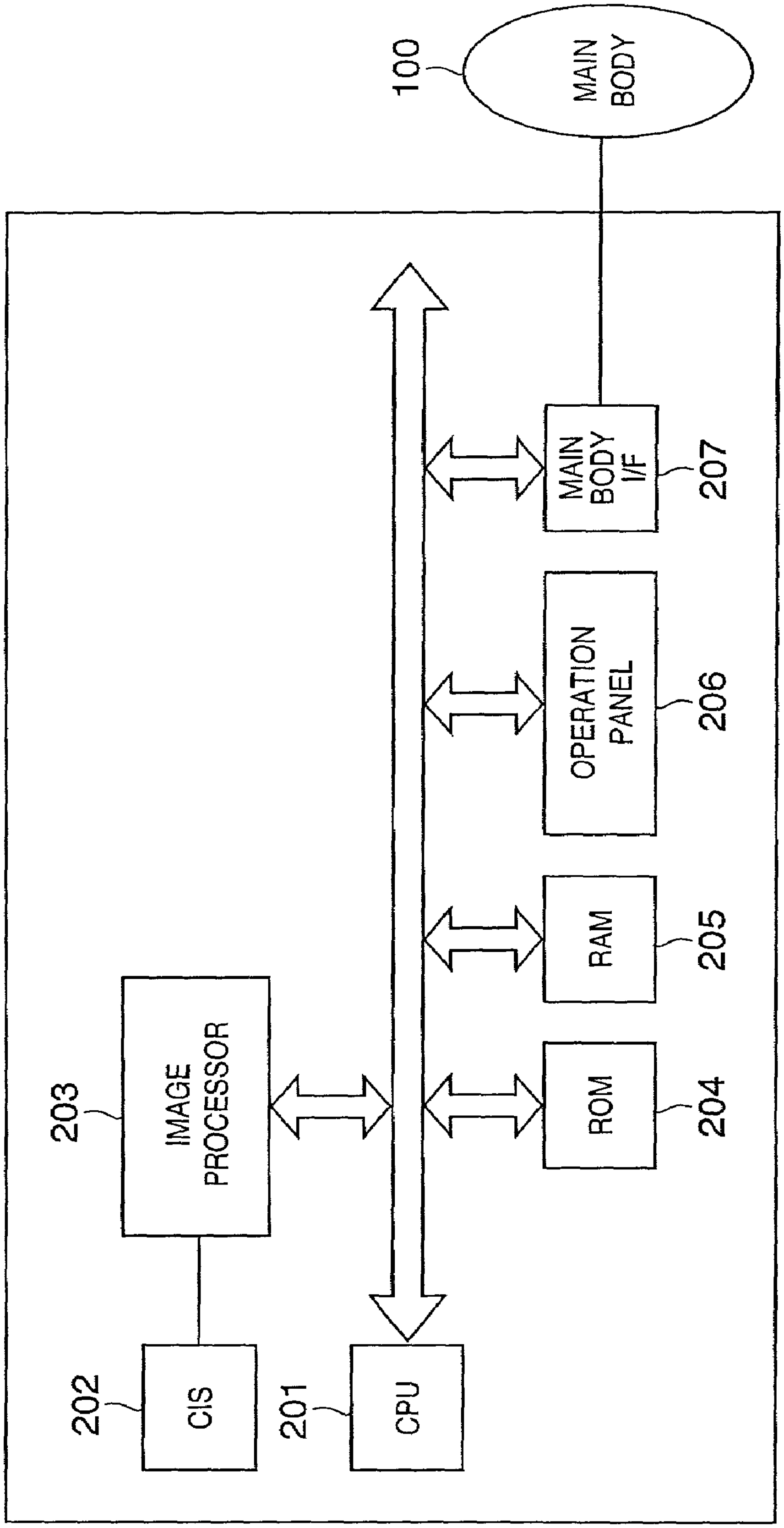
FIG. 2 is a block diagram showing the arrangement of a hand scanner 200 in FIG. 1.

FIG. 2 is a block diagram showing the arrangement of the hand scanner 200. Referring to FIG. 2, a CPU 201 has a function of JPEG-compressing/expanding digital image data by middleware. A ROM 204 stores programs for image reading control and image compression control. A RAM 205 stores read images. This RAM 205 can also be used as the work area of the CPU 201.

A body interface 207 has a connector for connecting to the body 100. An operation panel 206 comprises a key input unit for setting various conditions and a liquid crystal display for displaying diverse status. A CIS (Contact Image Sensor) 202 contains LED arrays of red (R), green (G), and blue (B). When receiving a read timing signal, this CIS 202 outputs a video signal in synchronism with the timing signal.

An image processor 203 A/D-converts the output video signal from the CIS 202, and further converts the signal into digital multi-valued/binary data by shading correction and luminance/density gamma conversion. The image data converted into the digital data is stored in the RAM 205 and transmitted to the facsimile apparatus body 100 via a radio channel, where necessary, or the body interface 207 at a later time.

Figure 3:
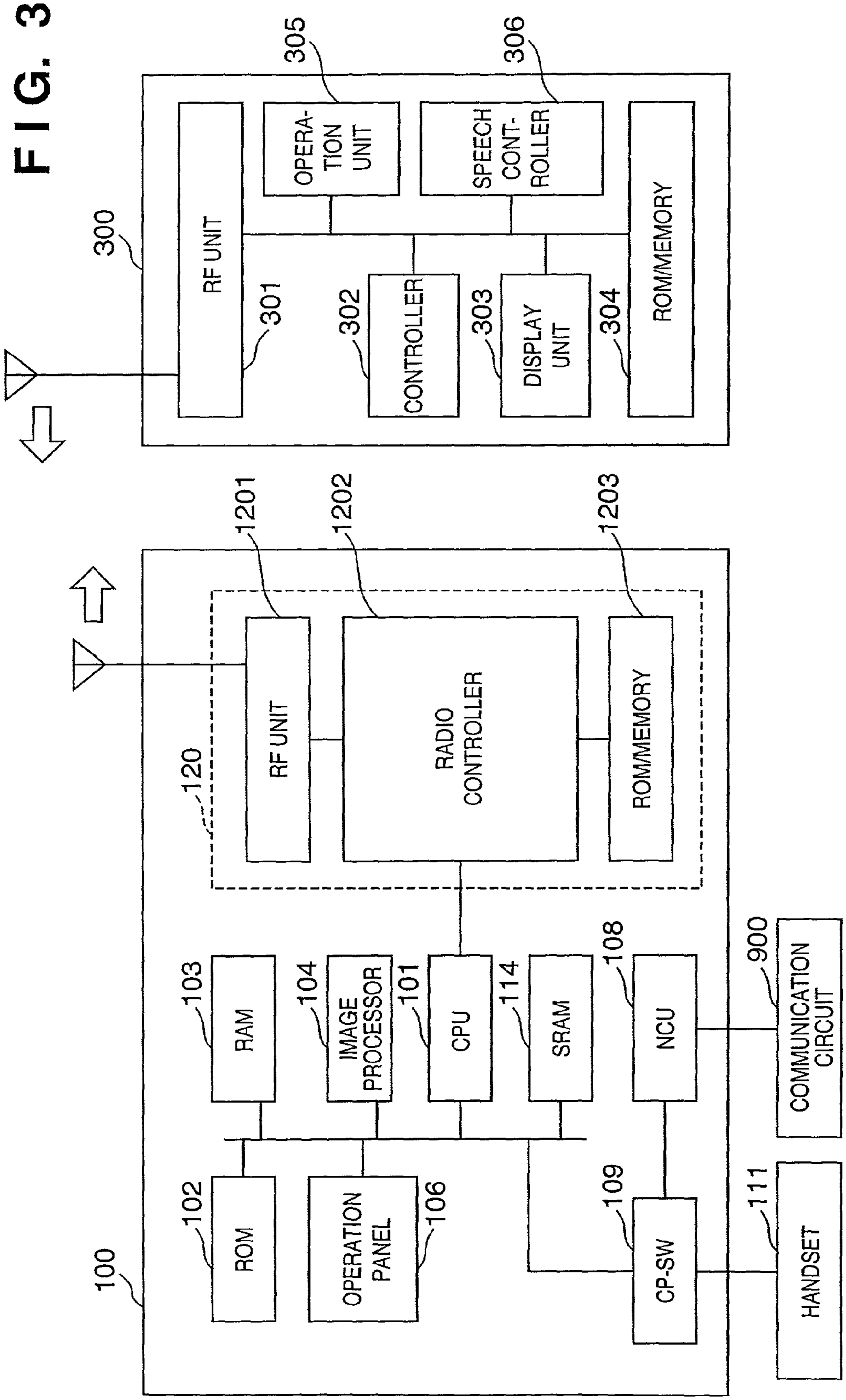
FIG. 3 is a block diagram showing the connection between the facsimile apparatus in FIG. 1 and its cordless subsidiary machine.

Connection Block Configuration of Facsimile Apparatus and Cordless Subsidiary Machine FIG. 3 is a block diagram showing the connection between the facsimile apparatus and a cordless subsidiary machine. Referring to FIG. 3, reference numeral 100 denotes the facsimile apparatus body as a master machine; and 300, a cordless subsidiary machine.

The facsimile apparatus body as a master machine is composed primarily of a facsimile control block for performing facsimile control, and a cordless subsidiary machine I/F block 120 which connects to the cordless subsidiary machine 300 by radio and controls transmission/reception of speech and various data. In FIG. 3, some components such as the scanner interface 107 in FIG. 1 are omitted for an easy understanding of the drawing.

The CPU 101 controls the whole apparatus in accordance with the programs stored in the ROM 102. This CPU 101 and the cordless subsidiary machine 300 connect to each other by radio and control transmission/reception of speech and various data.

The cordless subsidiary machine I/F block 120 is connected to the CPU 101 by an internal serial type data interface, and exchanges information of, e.g., operation instruction/status monitoring at predetermined timings. This cordless subsidiary machine I/F block 120 includes an RF unit 1201 for signal conversion, a ROM/memory 1203 which stores a program for controlling the cordless subsidiary machine I/F block 120 and is used as a buffer for internal variables/communication, and a radio controller 1202 for controlling the cordless subsidiary machine I/F block 120 in accordance with the control program, thereby controlling communication with the cordless subsidiary machine 300. When radio communication is to be performed between the facsimile apparatus body 100 and the cordless subsidiary machine 300, the cordless subsidiary machine I/F block 120 converts a signal from a communication line 900 or a signal from the handset 111 of the facsimile apparatus body 100 into a radio signal, and transmits this radio signal from the antenna. Also, the cordless subsidiary machine I/F block 120 receives a radio signal from the cordless subsidiary machine 300 and transmits the signal to the communication line 900 or the handset 111 of the facsimile apparatus body 100.

The cordless subsidiary machine 300 includes an RF unit 301, an operation unit 305, a display unit 303, a controller 302, and a ROM/memory 304. The RF unit 301 analyzes a radio signal received from the facsimile apparatus body 100 and converts the signal into a speech signal or control signal. This RF unit 301 also converts a control signal from the controller 302 or a signal from a speech processor 306 into a radio signal and transmits the signal from the antenna. The operation unit 305 performs diverse key operations. The display unit 303 displays the status of the apparatus, e.g., guidance of operations such as registration, various warnings, and time. The controller 302 controls the whole cordless subsidiary machine 300. The ROM/memory 304 stores a control program of the controller 302 and is used as a buffer for internal variables/communication.

The operations of the facsimile apparatus having the above arrangement will be explained below. The operations described below are particularly the registration to a telephone directory by the use of e-mail, the generation of telephone directory data, the formation of transmission mail based on the e-mail format, and the transmission of e-mail to another information communicating terminal via a public network and the Internet.

Telephone Directory Data Structure

Figure 4:
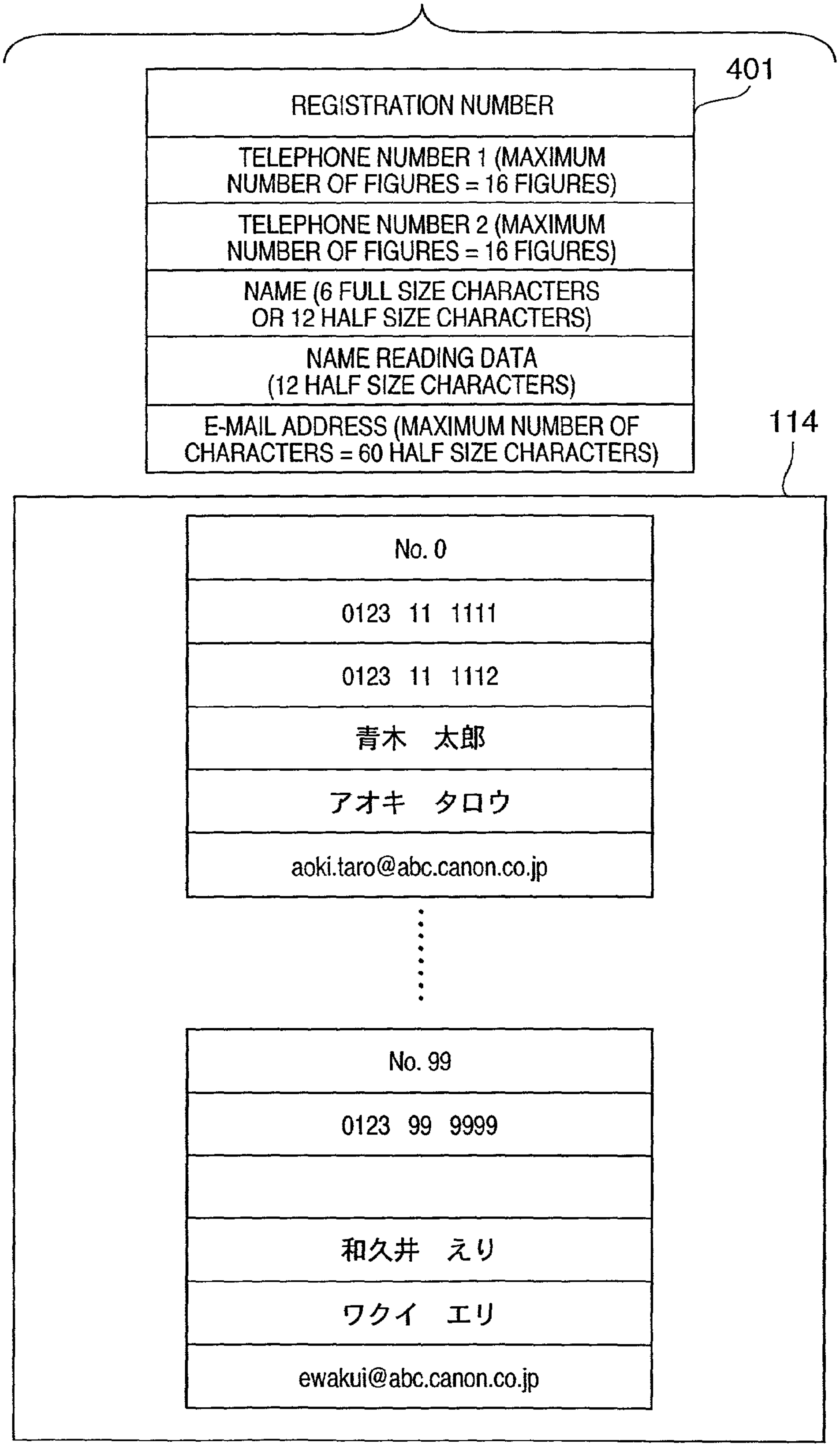
FIG. 4 is a view showing the data structure of a telephone directory according to this embodiment.

First, the structure of telephone directory data in this embodiment will be described. FIG. 4 is a view showing the data structure of a telephone directory used in the facsimile apparatus according to this embodiment. As shown in FIG. 4, telephone directory data has a structure in which communication partner information 401, such as an internal management number (registration number), name, name reading data, two telephone numbers, and e-mail address, is stored in units of elements (fields) for one communication partner. In this embodiment, data corresponding to a total of 100 communication partners from registration Nos. 0 to 99, for example, can be stored in the SRAM 114. Also, in this embodiment, a telephone number has a maximum of 16 figures, a name has 6 full size characters or less (12 half size characters or less) name reading data has 12 half size katakana characters or less, and an e-mail address has 60 half size characters or less.

E-mail Format

E-mail handled by the facsimile apparatus of this embodiment has a data format widely used in the Internet and standardized as MIME (Multipurpose Internet Mail Extensions). By this format, the contents and lengths of messages to be exchanged are not limited. Also, multimedia data such as images, sounds, and video can be transmitted/received by e-mail in addition to text data.

E-mail is basically composed of a header and a body. The header contains reception date/time information, address information of a sender and a recipient, and the like. In addition, this header contains a content type indicating data contents necessary for the receiving side to identify and process the body (the contents of the mail). The body is basically defined so as not to be restricted by the contents of data. However, this embodiment will be explained on the assumption that the body is in a text form which can be handled most versatilely. Note that the body is of course not limited to a text form.

Registration from E-mail to Telephone Directory

Figure 5:
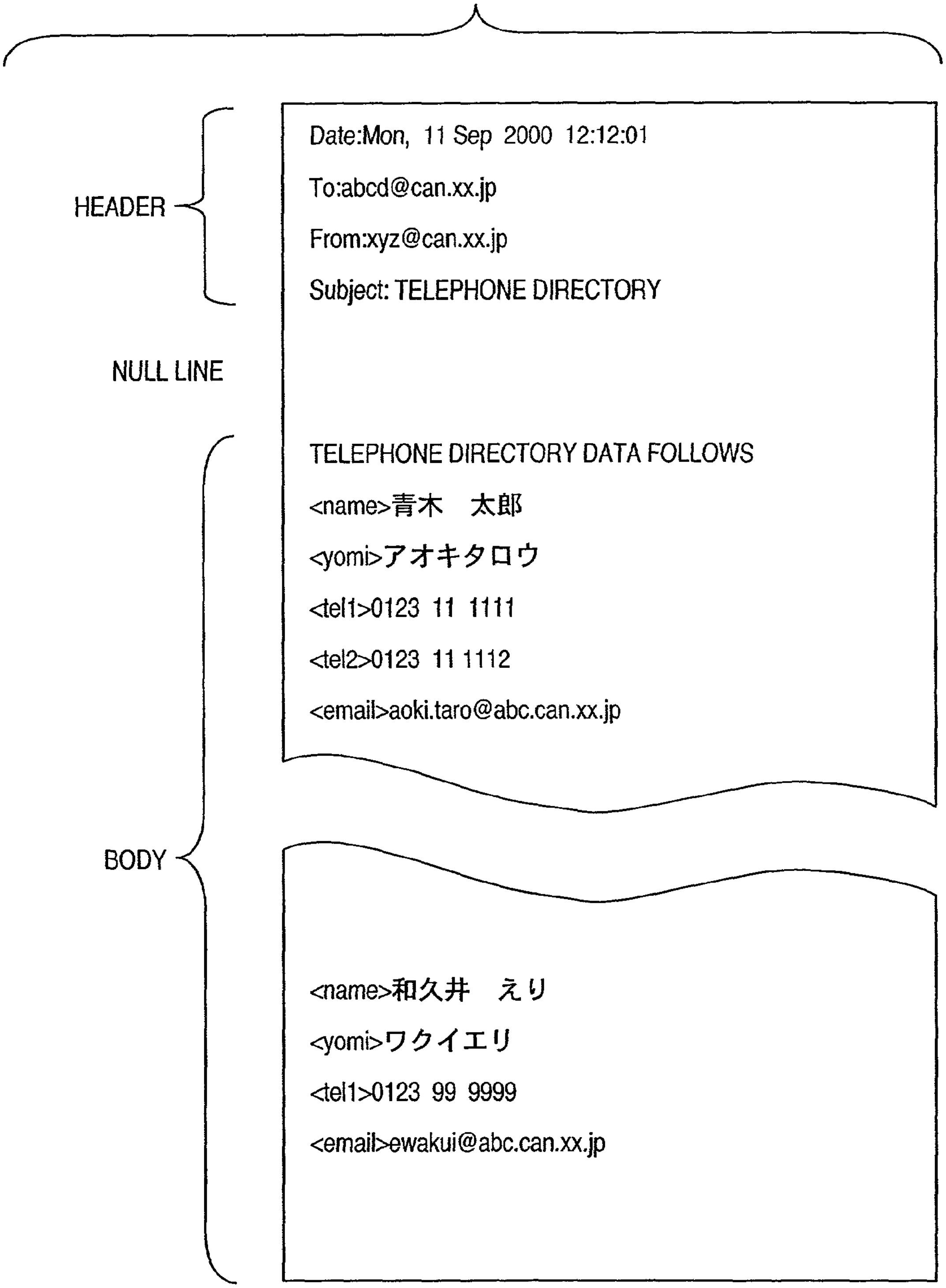
FIG. 5 is a view showing an example of e-mail in a text form, which is used in registration of the telephone directory in the facsimile apparatus according to this embodiment.

FIG. 5 is a view showing an example of e-mail in a text form which can be used in telephone directory registration in the facsimile apparatus according to this embodiment.

Reception date/time information, address information of a sender and a recipient, and the like are extracted from the header of e-mail containing telephone directory data in the body, and stored in a mail management area of the RAM 103. Similar to this header, the body in a text form is stored in a body information storage area of the RAM 103.

In this embodiment, a character string enclosed in "<>" in the text (body) of received mail is an identifier. A communication partner name, name reading data, telephone number 1, telephone number 2, and mail address are represented by identifiers <name>, <yomi>, <tel1>, <tel2>, and <email>, respectively.

While checking received mail, the user of the facsimile apparatus of this embodiment can extract an identifier in the body of the received mail and store a character string following the identifier into a telephone directory registration area of the SRAM 114 in accordance with the telephone directory data structure shown in FIG. 4, by operating the operation panel 106 to designate registration of telephone directory data.

Figure 6:
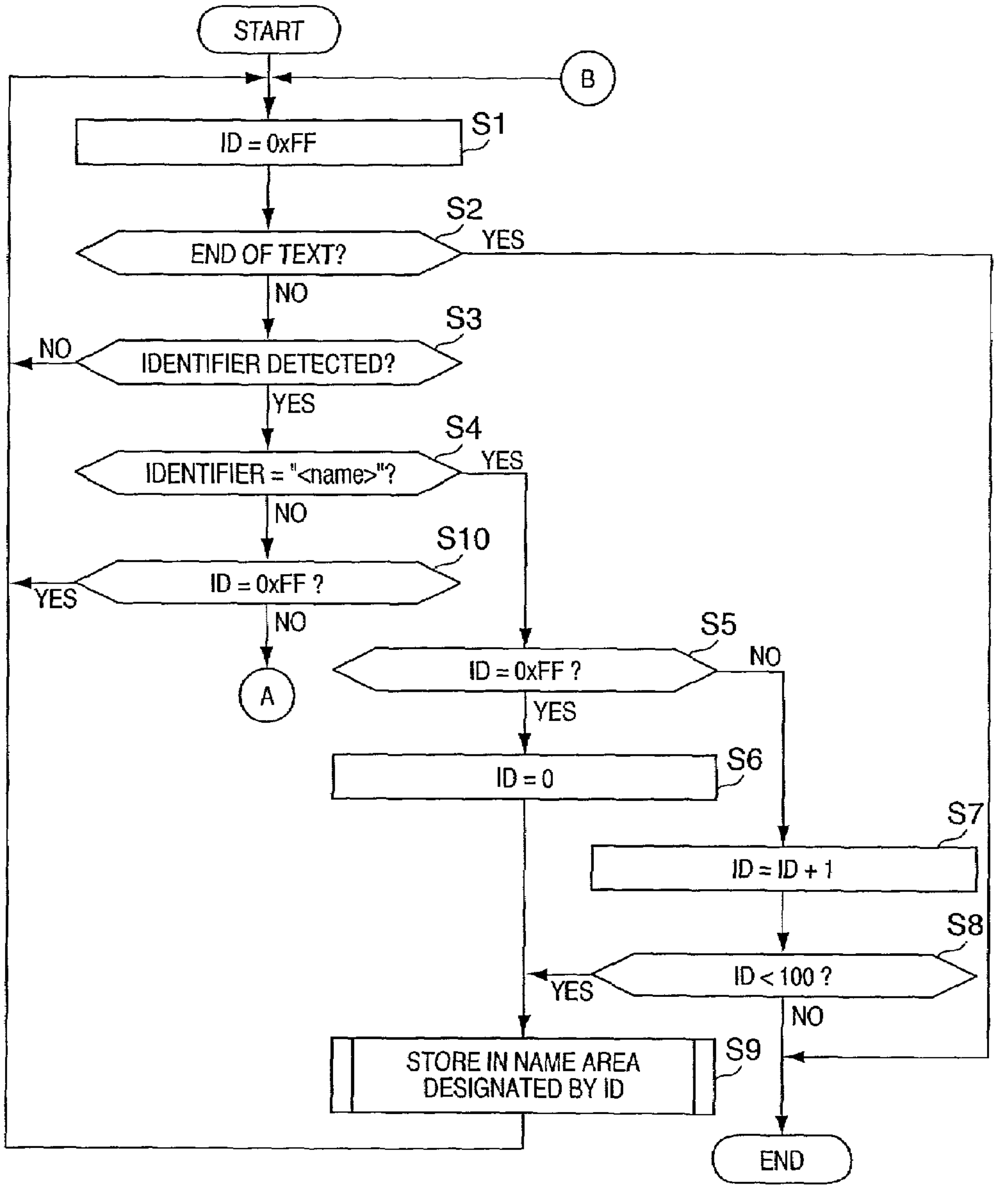
FIG. 6 is a flow chart for explaining a telephone directory data registration process in the facsimile apparatus according to this embodiment.
Figure 7:
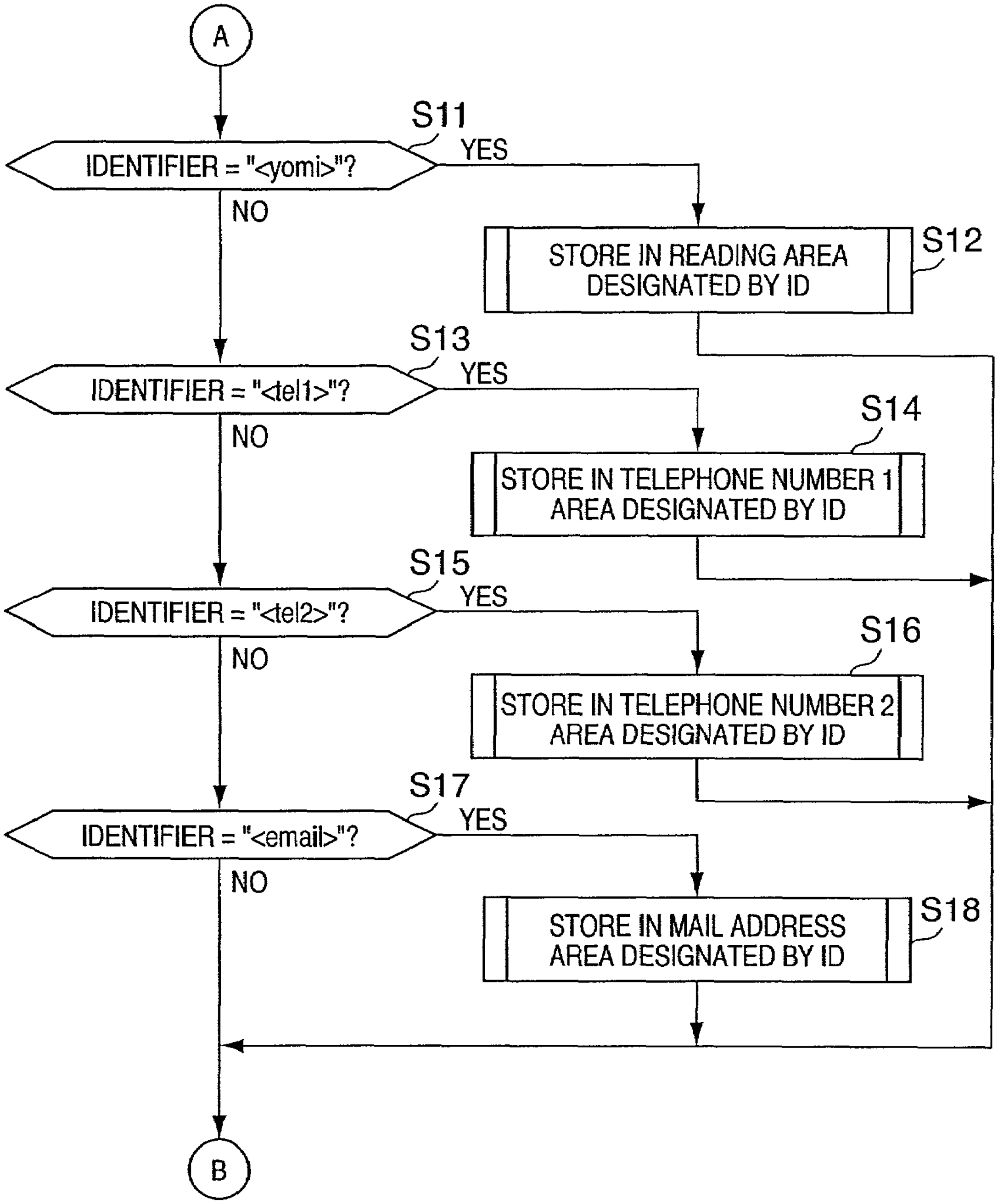
FIG. 7 is a flow chart for explaining the telephone directory data registration process in the facsimile apparatus according to this embodiment.

FIGS. 6 and 7 are flow charts showing the procedure of registering telephone directory data in the facsimile apparatus according to this embodiment. This process program is stored in the ROM 102 and executed by the CPU 101. This process program detects an identifier by searching text data of the mail body character by character from the leading position of the body separated by a NULL line (containing only CR/LF) from the header, and registers various telephone directory data. "ID" is the index number of telephone directory data internally managed by the facsimile apparatus, and corresponds to the registration number in FIG. 4.

First, the CPU 101 initializes this "ID" to 0xFF (step S1), and checks whether the end code of the mail body is detected (step S2). If the end code is detected, the CPU 101 terminates this registration process.

If no end code is detected in step S2, the CPU 101 checks whether an identifier is detected (step S3). In this embodiment, defined character strings "name", "yomi", "tel1", "tel2", and "email" beginning with "<" and followed by ">" are detected as identifiers.

If an identifier is detected, the CPU 101 checks whether the detected identifier is the communication partner name "<name>" (step S4). If the identifier is the communication partner name, the CPU 101 checks whether "ID" is 0xFF (step S5). If "ID" is 0xFF, the CPU 101 replaces the contents of "ID" with 0 (step S6). If "ID" is not 0xFF, the CPU 101 increments "ID" by one (step S7). This processing advances the registration number of the telephone directory data by one only when the identifier "<name>" is detected.

The CPU 101 then checks whether a maximum registrable number N (in this embodiment, 100) is reached (step S8). As described above, the facsimile apparatus of this embodiment can register 100 pieces of communication partner information having IDs from 0 to 99. Therefore, if the ID has reached 100 in step S8, this means that the IDs up to 99 are already used and no more registration is possible. Note that the maximum registrable number N can be an arbitrary number.

If "ID" is smaller than 100 in step S8, the CPU 101 stores a character string following the identifier "<name>" into the communication partner name field of a telephone directory registration area corresponding to the registration number designated by "ID" (step S9). The end of the character string is determined by detecting CR/LF appearing for the first time after the identifier. After that, the flow returns to the processing in step S1. If "ID" has reached 100 in step S8, the CPU 101 terminates the process.

On the other hand, if the identifier is not "<name>" in step S4, the CPU 101 checks whether "ID" is 0xFF (step S10). If "ID" is 0xFF, the CPU 101 determines that this identifier is an invalid one, and the flow returns to the search process in step S1. If “ID” is not 0xFF in step S10, the CPU 101 performs processing (FIG. 7) from step Sl. That is, the CPU 101 registers a character string into a field, corresponding to the detected identifier, of a telephone directory registration area having a registration number corresponding to this “ID”.

First, the CPU 101 checks whether the identifier is “<yomi>” (step S11). If the identifier is “<yomi>”, the CPU 101 stores a character string following “<yomi>” into the reading data field of the telephone directory area designated by “ID” (step S12). Reading data represents the reading of the communication partner name by katakana characters. This data is used in a sorting process which rearranges data in code sequence in order to facilitate searching the telephone directory. After that, the flow returns to the processing in step S1.

On the other hand, if the identifier is not “<yomi>” in step S11, the CPU 101 checks whether the identifier is “<tel1>” (step S13). If the identifier is “<tel1>”, the CPU 101 stores a character string following the identifier “<tel1>” into the telephone number 1 data field of the telephone directory registration area designated by “ID” (step S14). After that, the flow returns to the processing in step S1.

If the identifier is not “<tel1>”, the CPU 101 similarly checks whether the identifier is “<tel2>” (step S15). If the identifier is “<tel2>”, the CPU 101 stores a character string following the identifier “<tel2>” into the telephone number 2 data field of the telephone directory registration area designated by “ID” (step S16). After that, the flow returns to the processing in step S1.

If the identifier is not “<tel2>”, the CPU 101 similarly checks whether the identifier is “<email>” (step S17). If the identifier is “<email>”, the CPU 101 stores a character string following the identifier “<email>” into the e-mail address data field of the telephone directory registration area designated by “ID” (step S18). After that, the flow returns to the processing in step S1. If the identifier is not “<email>”, the flow directly returns to the processing in step S1.

As described above, in the facsimile apparatus of this embodiment, the data structure of the telephone directory can manage two telephone numbers and one e-mail for one communication partner. This is already described with reference to FIG. 4.

Note that the identifier “<tel2>” can also be nullified in a communication apparatus capable of managing only one telephone number for one communication partner. That is, an identifier such as “<tel2>” which a communication apparatus does not manage (know) can be neglected, and a character string following the identifier need not be registered.

Note also that the length of a character string following an identifier is not fixed but can be freely set in accordance with the size of the registration area of a communication apparatus. For example, when data having a larger number of characters than that can be registered in a communication apparatus, overflowing characters need not be registered. Accordingly, a user can form e-mail containing telephone directory data without caring the data structure of the telephone directory of a communication apparatus at the transmission destination.

Furthermore, it is not at all necessary to distinguish e-mail containing telephone directory data from common e-mail, and the contents need not be restricted to telephone directory data. For example, the sender of e-mail can create a common document such as “Hello! This is ○X○X. The following is telephone directory data of customers.” as a comment into the body of the mail. This allows a sender and a recipient to conveniently exchange telephone directory data.

Process of Generating E-mail from Telephone Directory Data

Figure 8A:
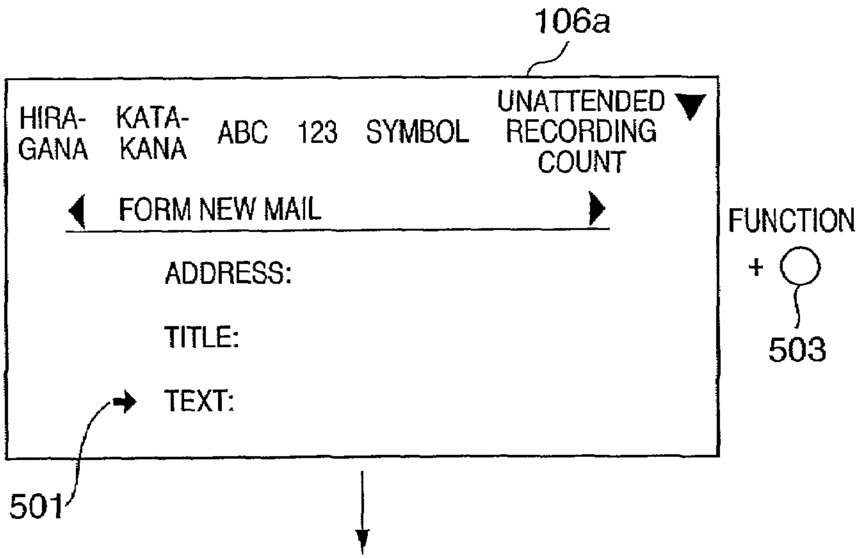
FIGS. 8A to 8C are views for explaining the operation of generating e-mail describing telephone directory data in the body.
Figure 8B:
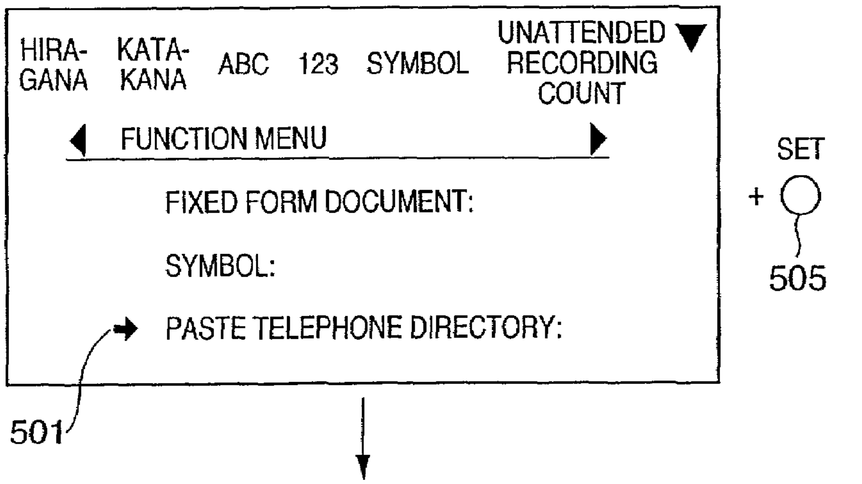
Figure 8C:
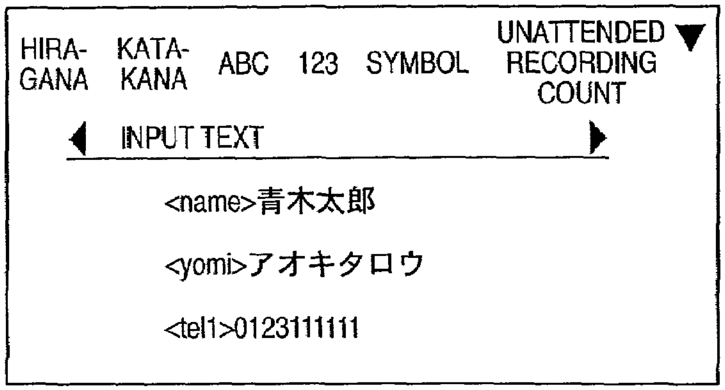

Next, the process of generating e-mail containing telephone directory data on the basis of internally held telephone directory data in the facsimile apparatus according to this embodiment will be described below. FIGS. 8A to 8C are views for explaining the operation procedure when the user of the facsimile apparatus according to this embodiment forms e-mail containing telephone directory data in the body of the mail.

Figure 9:
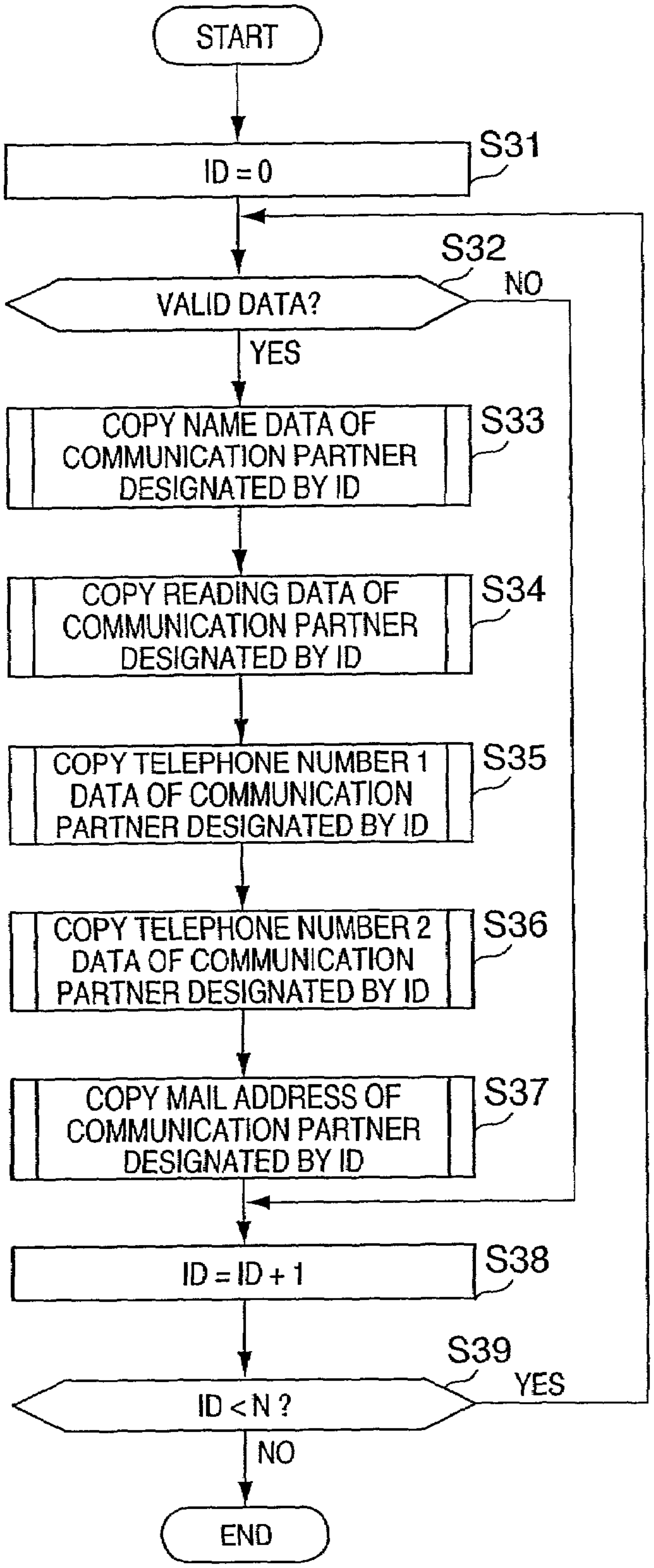
FIG. 9 is a flow chart for explaining the process of forming e-mail describing telephone directory data in the body, in the facsimile apparatus according to this embodiment.

The user presses a function button 503 of the operation panel 106 while a cursor 501 points “TEXT” in a new mail formation window (FIG. 8A) displayed on a liquid crystal display 106*a* of the operation panel 106, thereby displaying a function menu window (FIG. 8B). In addition, the user selects “PASTE TELEPHONE DIRECTORY” from this function menu by the cursor 501 and presses a set button 505 of the operation panel 106. Consequently, a process to be described later with reference to FIG. 9 is executed, and an e-mail text editing window (FIG. 8C) is displayed. This window shows telephone directory data, such as the names, name reading data, two telephone numbers, and e-mail addresses of all communication partners registered in the telephone directory, together with the corresponding identifiers. After that, the user can delete telephone directory data of a communication partner which he or she does not want to register, add information of a new communication partner, and input other messages, thereby generating final e-mail data.

FIG. 9 is a flow chart for explaining an e-mail text formation process performed when the execution of “PASTE TELEPHONE DIRECTORY” is selected in the function menu shown in FIG. 8B. This process is implemented when the CPU 101 executes a program stored in the ROM 102.

Referring to FIG. 9, “ID” is, as previously stated, the index number (registration number) of telephone directory data internally managed by this facsimile apparatus. In this embodiment, one index number is assigned to one communication partner.

“N” is the maximum number of registrable communication partners which can be managed by the telephone directory. As described earlier, 100 communication partners can be registered in this facsimile apparatus, so N=100. Additionally, the telephone directory management area in the facsimile apparatus is initialized by a NULL code and so managed that the end of data stored in each element area is a NULL code.

First, the CPU 101 initializes “ID” to 0 (step S31). The CPU 101 then checks whether all element fields in telephone directory data of a communication partner designated by “ID” are NULL codes (step S32). If all element fields are NULL codes, the CPU 101 determines that this ID contains no valid communication partner data, and the flow advances to processing in step S38.

If the CPU 101 determines in step S32 that not all element fields are NULL codes but some element fields contain valid data, the CPU 101 extracts name data from telephone directory data of a communication partner designated by “ID”, and copies this name data to a text information portion of e-mail to be formed, by adding the identifier “<name>” to the header (step S33).

Similarly, the CPU 101 extracts name reading data and copies this name reading data to the text information portion of the e-mail to be formed, by adding the identifier "<yomi>" to the header (step S34).

Likewise, the CPU 101 extracts telephone number 1 data and copies this telephone number 1 data to the text information portion of the e-mail to be formed, by adding the identifier "<tel1>" to the header (step S35).

Analogously, the CPU 101 extracts telephone number 2 data and copies this telephone number 2 data to the text information portion of the e-mail to be formed, by adding the identifier "<tel2>" to the header (step S36).

Finally, the CPU 101 extracts e-mail address data and copies this e-mail address data to the text information portion of the e-mail to be formed, by adding the identifier "<email>" to the header (step S37).

Note that in the processing in steps S33 to S37, a return code CR/LF is added to the end of each line where necessary.

When completing copying of telephone directory data corresponding to one ID as described above, the CPU 101 increments the ID (step S38) and compares this ID with the maximum registrable number N of the telephone directory, thereby checking whether the processing is performed up to the maximum ID (99) in the telephone directory (step S39). If the ID is smaller than 100, the flow returns to the processing in step S32, and the processing from step S33 is repeated. In this manner, it is possible to generate e-mail data having in its body all telephone directory data managed by this facsimile apparatus. As described previously, telephone directory data is text format data.

After that, the user can select only a specific one of a plurality of telephone directory data pasted to the text information portion of the e-mail.

The communication apparatus (facsimile apparatus) of this embodiment can exchange telephone directory data by e-mail with an information terminal such as a personal computer or with another communication apparatus. This facilitates registration, editing, and management of telephone directory data. In particular, telephone directory data can be backed up by transmitting e-mail containing this telephone directory data in the body to another communication apparatus which can be used by the user. Accordingly, telephone directory data can be easily transferred to a newly purchased communication terminal. Also, since telephone directory data can be exchanged in a text form, telephone directory data can be shared by all communication apparatuses having an e-mail function.

The foregoing is the explanation of the embodiment of the present invention. However, the present invention is not limited to the above embodiment. That is, the present invention is applicable to functions described in the scope of claims, or to any arrangement which can achieve the functions of the arrangement of the embodiment.

For example, the operation panel 106 can also be equipped with a telephone directory data registration button. In this case, only when a user presses this registration button, the registration process shown in FIGS. 6 and 7 is executed to register telephone directory data from received e-mail.

The present invention can be applied to a system constituted by a plurality of devices (e.g., a host computer, interface, reader, and printer) or to an apparatus comprising a single device.

Further, the present invention can also be achieved by supplying a program to a system or an apparatus by using a storage medium storing program codes of software for implementing the functions of the above embodiment. In this case, the program codes themselves read out from the storage medium implement the novel functions of the present invention, and the program itself and the storage medium storing the program constitute the invention.

In the above embodiment, the program codes shown in the flow charts of FIGS. 6, 7, and 9 are stored in the ROM 102 as a storage medium. As this storage medium for supplying the program codes, it is possible to use, e.g., a floppy disk, hard disk, CD-ROM, CD-R, DVD, magnetic tape, and nonvolatile memory card.

The present invention can register telephone directory data at once from e-mail containing the telephone directory data into a telephone directory of a communication apparatus. The present invention can also simultaneously generate pieces of communication partner information contained in a telephone directory into the body of e-mail to be transmitted.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus having a function of transmitting/receiving e-mail, comprising:

receiving means for receiving an e-mail;

storage means for storing a plurality of kinds of communication partner information including an e-mail address or a telephone number for each communication partner;

first detecting means for detecting, from the received e-mail, a plurality of identifiers in a body part of the received e-mail, where each of the plurality of identifiers is represented by a first character string and symbols bracketing the first character string;

specifying means for specifying kinds of identifiers detected by said first detecting means;

second detecting means for detecting a plurality of second character strings, each of which follows each of the respective identifiers specified by said specifying means;

registering means for registering the plurality of second character strings detected by said second detecting means into areas in said storage means, each of which corresponds to the kind of the identifier followed by the second character string; and control means for controlling said registering means to perform the registration only if the detected identifier followed by the second character string is one of a predetermined kind of identifier, wherein if a plurality of identifiers, each of which indicates the name of a communication partner, are specified by said specifying means, said control means controls said registering means to repeatedly perform the registration for every identifier indicating the name of the communication;

sending means for sending an e-mail;

extracting means for extracting the communication partner information stored in said storage means;

adding means for adding, to every communication partner information extracted by said extracting means, an identifier corresponding to the kind of the communication partner information; and generating means for generating an e-mail including, in its body part, all of the extracted communication partner information with the identifier;

wherein said sending means sends the e-mail generated by said generating means to a new communication apparatus in order to enable the new communication apparatus to register the communication partner information into a storage means by receiving the e-mail.

2. The apparatus according to claim 1, further comprising registration designating means by which a user designates registration by said registering means, wherein said registering means registers only information whose registration is designated by said registration designating means.

3. The apparatus according to claim 1, wherein the second character string indicated by the detected identifier is text information subsequent to the detected identifier.

4. The apparatus according to claim 1, wherein if a length of the second character string detected by said second detecting means is longer than a predetermined length, said control means controls said registering means not to perform the registration.

5. The apparatus according to claim 1, wherein if the specified identifier is a name of a communication partner, said specifying means further specifies a telephone number or an e-mail address corresponding to the name.

6. A control method of a communication apparatus which comprises storage means for storing a plurality of kinds of communication partner information including an e-mail address or a telephone number for each communication partner, and which has a function of transmitting/receiving e-mail, comprising:

a receiving step of receiving an e-mail;

a storing step of storing the plurality of kinds of communication partner information in a storage means, including the e-mail address or the telephone number for each communication partner;

a first detection step of detecting, from the received e-mail, a plurality of identifiers in a body part of the received e-mail, where each of the plurality of identifiers is represented by a first character string and symbols bracketing the first character string a specifying step for specifying kinds of identifiers detected by the first detection step;

a second detecting step for detecting a plurality of second character strings, each of which follows each of the respective identifiers specified by the specifying step;

a registration step of registering the plurality of second character strings detected by the second detecting step into areas in the storage means, each of which corresponds to the kind of the identifier followed by the second character string;

a controlling step of controlling the registering step to perform the registration only if the detected identifier followed by the second character string is one of a predetermined kind of identifier, wherein if a plurality of identifiers, each of which indicates the name of a communication partner, are specified by the specifying step, said controlling step controls the registering step to repeatedly perform the registration for every identifier indicating the name of the communication partner;

a sending step of sending an e-mail;

an extraction step of extracting the communication partner information stored in said storage means;

an addition step of adding, to every communication partner information extracted by the extracting step, an identifier corresponding to the kind of the communication partner information; and a generating step of generating an e-mail including, in its body part, all of the extracted communication partner information with the identifier, wherein the sending step sends the e-mail generated in the generating step to a new communication apparatus in order to enable the new communication apparatus to register the communication partner information into a storage means by receiving the e-mail.

7. The method according to claim 6, wherein the registration step comprises registering only information whose registration is designated by the user of said communication apparatus.

8. The method according to claim 6, wherein the second character string indicated by the detected identifier is text information subsequent to the detected identifier.

9. The method according to claim 6, wherein if a length of the second character string detected by said second detecting step is longer than a predetermined length, said controlling step controls said registering step not to perform the registration.

10. The method according to claim 6, wherein if the specified identifier is a name of a communication partner, said specifying step further specifies a telephone number or an e-mail address corresponding to the name.

11. A control program of a communication apparatus, said control program being executable by said communication apparatus and being stored on a storage medium which is readable by said communication apparatus, wherein said communication apparatus comprises storage means for storing a plurality of kinds of communication partner information including an e-mail address or a telephone number for each communication partner, and which has a function of transmitting/receiving e-mail, said control program comprising:

code for a receiving step of receiving an e-mail;

code for a storing step of storing the plurality of kinds of communication partner information in a storage means, including the e-mail address or the telephone number for each communication partner;

code for a first detection step of detecting, from the received e-mail, a plurality of identifiers in a body part of the received e-mail, where each of the plurality of identifiers is represented by a first character string and symbols bracketing the first character string;

code for a specifying step for specifying kinds of identifier detected by the first detection step;

code for a second detection step for detecting a plurality of second character strings, each of which follows each of the respective identifiers specified by the specifying step;

code for a registration step of registering the plurality of second character strings detected by the second detecting step into areas in the storage means, each of which corresponds to the kind of the identifier followed by the second character string;

code for a controlling step of controlling the registering step to perform the registration only if the detected identifier followed by the second character string is one of a predetermined kind of identifier, wherein if a plurality of identifiers, each of which indicates the name of a communication partner, are specified by the specifying step, the controlling step controls the registering step to repeatedly perform the registration for every identifier indicating the name of the communication partner;

code for a sending step of sending an e-mail;

code for an extraction step of extracting the communication partner information stored in said storage means;

code for an addition step of adding, to every communication partner information extracted by the extracting step, an identifier correspondinig to the kind of the communication partner informatiom; and code for a generating step of generating an e-mail including, in its body part, all of the extracted communication partner information with the identifier, wherein the sending step sends the e-mail generated in the generating step to a new communication apparatus in order to enable the new communication apparatus to register the communication partner information into a storage means by receiving the e-mail.

* * * * *

UNITED STATES PATENT AND TRADEMARK OFFICE

CERTIFICATE OF CORRECTION

PATENT NO. : 7,113,976 B2
APPLICATION NO. : 10/056031
DATED : September 26, 2006
INVENTOR(S) : Naoya Watanabe It is certified that error appears in the above-identified patent and that said Letters Patent is hereby corrected as shown below:

COLUMN 7:
Line 2, "step S1." should read -- step S11. --; and
Line 59, "caring" should read --sense--

COLUMN 11:
Line 37, "string" should read -- string; --.

COLUMN 13:
Line 2, "informatiom;" should read -- information; --.

Signed and Sealed this

Tenth Day of April, 2007

JON W. DUDAS
*Director of the United States Patent and Trademark Office*